United States Patent
Vollrath et al.

(10) Patent No.: US 7,500,540 B2
(45) Date of Patent: Mar. 10, 2009

(54) SUCTION MUFFLER FOR A HERMETIC COMPRESSOR

(75) Inventors: Ingwald Vollrath, Joinville - SC (BR); Claudio Roberto Hille, Joinville - SC (BR)

(73) Assignee: Empresa Brasileira de Compressores S.A. Embraco, Joinville (BR)

(*) Notice: Subject to any disclaimer, the term of this patent is extended or adjusted under 35 U.S.C. 154(b) by 497 days.

(21) Appl. No.: 10/549,956

(22) PCT Filed: Mar. 25, 2004

(86) PCT No.: PCT/BR2004/000039

§ 371 (c)(1),
(2), (4) Date: Nov. 29, 2005

(87) PCT Pub. No.: WO2004/085848

PCT Pub. Date: Oct. 7, 2004

(65) Prior Publication Data

US 2006/0118358 A1    Jun. 8, 2006

(30) Foreign Application Priority Data

Mar. 28, 2003    (BR) .................................. 0300905

(51) Int. Cl.
| | |
|---|---|
| F16F 7/00 | (2006.01) |
| F16F 15/04 | (2006.01) |
| F16F 17/073 | (2006.01) |
| F16F 15/00 | (2006.01) |
| F16F 15/02 | (2006.01) |
| F16J 15/02 | (2006.01) |

(52) U.S. Cl. ................. 181/207; 277/612; 277/616; 277/637; 277/648

(58) Field of Classification Search ................ 181/262, 181/207, 209; 277/290, 296, 600, 612, 614, 277/615, 616, 626, 628, 637, 640, 641, 648, 277/649; 413/58, 9; 417/312
See application file for complete search history.

(56) References Cited

U.S. PATENT DOCUMENTS

| | | | | |
|---|---|---|---|---|
| 1,715,854 | A | * | 6/1929 | McKenzie-Martyn ....... 285/331 |
| 2,552,750 | A | * | 5/1951 | Thornhill ..................... 277/614 |
| 3,124,366 | A | * | 3/1964 | Hillman ...................... 277/612 |

(Continued)

FOREIGN PATENT DOCUMENTS

EP    0 902 184 A2    3/1999

(Continued)

Primary Examiner—Edgardo San Martin
(74) Attorney, Agent, or Firm—Darby & Darby P.C.

(57) ABSTRACT

A system for closing a suction muffler of a hermetic compressor, the suction muffler including: a hollow base; a cover to be coupled to the hollow base, the parts defined by the hollow base and the cover including respective mutually seatable peripheral flanges, which are shaped to define, jointly, an internal channel extended along at least part of the circumferential extension of the peripheral flanges and which is opened to the opposite external faces of the latter by means of throughbores axially aligned to each other in pairs, each pair of throughbores maintaining a circumferential distance in relation to an adjacent pair of throughbores, the throughbores of each pair and the internal channel being filled with a gasket of injected material, which projects outwardly from the throughbores so as to define an axial lock portion.

7 Claims, 4 Drawing Sheets

U.S. PATENT DOCUMENTS

| | | | | |
|---|---|---|---|---|
| 3,319,918 A * | 5/1967 | Rapata | ........................ | 248/239 |
| 3,836,183 A * | 9/1974 | Battle | ........................ | 285/363 |
| 4,040,372 A * | 8/1977 | Flanders | ........................ | 413/9 |
| 4,152,096 A * | 5/1979 | Murakami et al. | ........... | 415/200 |
| 4,709,933 A * | 12/1987 | Adamek et al. | .............. | 277/612 |
| 4,942,907 A * | 7/1990 | Joh et al. | .................... | 138/157 |
| 4,960,368 A | 10/1990 | Lilie | | |
| 5,341,654 A | 8/1994 | Hewette et al. | | |
| 5,687,975 A * | 11/1997 | Inciong | ........................ | 277/591 |
| 6,234,545 B1 * | 5/2001 | Babuder et al. | .............. | 285/364 |
| 6,361,049 B1 * | 3/2002 | Joco | ............................ | 277/312 |
| 6,361,290 B1 * | 3/2002 | Ide | ................................ | 417/312 |
| 6,362,548 B1 * | 3/2002 | Bingle et al. | ................... | 310/89 |
| 6,394,226 B1 * | 5/2002 | Cavicchioli | .................. | 181/282 |
| 6,761,541 B1 * | 7/2004 | Clendenin | .................... | 417/360 |
| 6,912,865 B2 * | 7/2005 | Seo et al. | ........................ | 62/295 |
| 7,011,539 B1 * | 3/2006 | Nagy et al. | .................. | 439/271 |
| 2004/0094906 A1 * | 5/2004 | Gentemann et al. | .......... | 277/637 |
| 2004/0096341 A1 * | 5/2004 | Hung | .......................... | 417/363 |

FOREIGN PATENT DOCUMENTS

FR          2690376     * 10/1993

* cited by examiner

SUCTION MUFFLER FOR A HERMETIC COMPRESSOR

CROSS REFERENCE TO PRIOR APPLICATION

This is a U.S. national phase application under 35 U.S.C. §371 of International Patent Application No. PCT/BR2004/000039, filed Mar. 25, 2004, and claims benefit of Brazilian Patent Application No. PI 0300905-0, filed Mar. 28, 2003 both of which are incorporated by reference herein. The International Application was published in English on Oct. 7, 2004 as WO 2004/085848 A1 under PCT Article 21(2).

FIELD OF THE INVENTION

The present invention refers to a system for closing a suction muffler of a compressor of the type used in refrigeration machines, such as refrigerators, freezers, water fountains, refrigerated counters, etc.

BACKGROUND OF THE INVENTION

The hermetic compressors of refrigeration systems have their suction usually provided with an acoustic dampening system (acoustic filter or suction muffler), mounted in the interior of the shell and which conducts the gas coming from the suction line to the suction valve.

The suction muffler performs several functions that are important to the good operation of the compressor, such as gas directioning, acoustic dampening and, in some cases, the thermal insulation of the gas being drawn to the interior of the cylinder.

The suction muffler is generally formed by a sequence of volumes and tubes that conduct the gas coming from the suction line directly to the suction valve. This displacement of the gas produces pulses, generating noises which are propagated in a direction opposite to that of the displacement of the gas towards the suction valve. The more efficient the suction muffler in its acoustic outlet through which the gas is admitted, the lower such pulses will be.

Another important function of the suction muffler is to conduct the gas to the suction valve with the lowest possible heating, avoiding thermal exchanges with the gas stagnated inside the shell of the compressor, and also reducing its contact with the hot parts of the interior of the compressor. On the other hand, the suction muffler means load loss for the gas flow being drawn. Its influence on the performance of the compressor is highly important. Most suction mufflers are constructed in a material of low thermal conductivity and affixed to the cylinder head of the compressor through the cylinder cover. The dimensioning of the internal volumes and the length of the tubes of the suction muffler determine, to a great extent, the efficiency thereof.

The suction mufflers generally comprise a hollow base, within which are defined chambers in the form of labyrinths for the passage of gas, and a cover that hermetically closes the hollow base.

There are well known methods for mutually joining and sealing the parts defined by the hollow base and the cover of the suction mufflers, such as through ultrasonic welding, metallic or plastic clamps that promote a sealing with tight fittings, and through adhesives.

The solutions that use welding are not generally satisfactory, since they allow the occurrence of excess welding material in the joining region of the parts of hollow base and cover, which is mainly prejudicial when said excess occurs in the interior of the suction muffler, since it interferes with the gas flow therein and does not guarantee the necessary tightness to the suction muffler.

The solutions using metallic or plastic clamps, as well as those using adhesives or insertion of material between the hollow base and the cover, have as disadvantages the high manufacturing cost and the fact of not guaranteeing the necessary tightness to the suction muffler.

Besides the solutions above, there are also known the solutions for joining the hollow base and the cover, such as those described in documents U.S. Pat. No. 6,394,226 and FR2690376, in which a sealing strap is injected externally to the joining region of said parts, generally involving the external peripheral edge of a pair of peripheral flanges that are mutually seatable, each projecting from the respective part defined by the hollow base and the cover in the joining region thereof. While solving the deficiencies of the techniques mentioned above, such constructions are susceptible to breaks and/or disengagements caused for example by impacts, fatigue or thermal variations, impairing the operation of the compressor.

OBJECTS OF THE INVENTION

Thus, it is an object of the present invention to provide a system for closing a suction muffler of a hermetic compressor of low cost and without presenting the deficiencies of the known prior art solutions.

Another object of the present invention is to provide a system as mentioned above, which allows the hermetic and safe union of the parts defined by the hollow base and the cover, independently of the geometric complexity of said parts, and with wider ranges of tolerance.

Another object of the present invention is to provide a system with the above characteristics, which presents high reliability and resistance to impacts, to thermal variations, and to fatigue.

SUMMARY OF THE INVENTION

These and other objects are attained by a system for closing a suction muffler of a hermetic compressor, said suction muffler comprising: a hollow base; a cover to be coupled to the hollow base, said parts defined by the hollow base and the cover including mutually seatable peripheral flanges; and a retaining means affixing the hollow base to the cover in the joining region where said peripheral flanges are mutually seated, which peripheral flanges are shaped to define, jointly, an internal channel, extended along at least part of the circumferential extension of said peripheral flanges and which is opened to the opposite external faces of said peripheral flanges by means of throughbores axially aligned to each other in pairs, each pair of throughbores maintaining a circumferential distance in relation to an adjacent pair of throughbores, the throughbores of each pair and the internal channel being filled with a gasket of injected material, which projects outwardly from the throughbores so as to define an axial lock portion to be seated on each of the adjacent opposite external faces of said peripheral flanges.

BRIEF DESCRIPTION OF THE DRAWINGS

The invention will be described below, with reference to the enclosed drawings, in which.

DESCRIPTION OF THE ILLUSTRATED EMBODIMENTS

Figure 1:
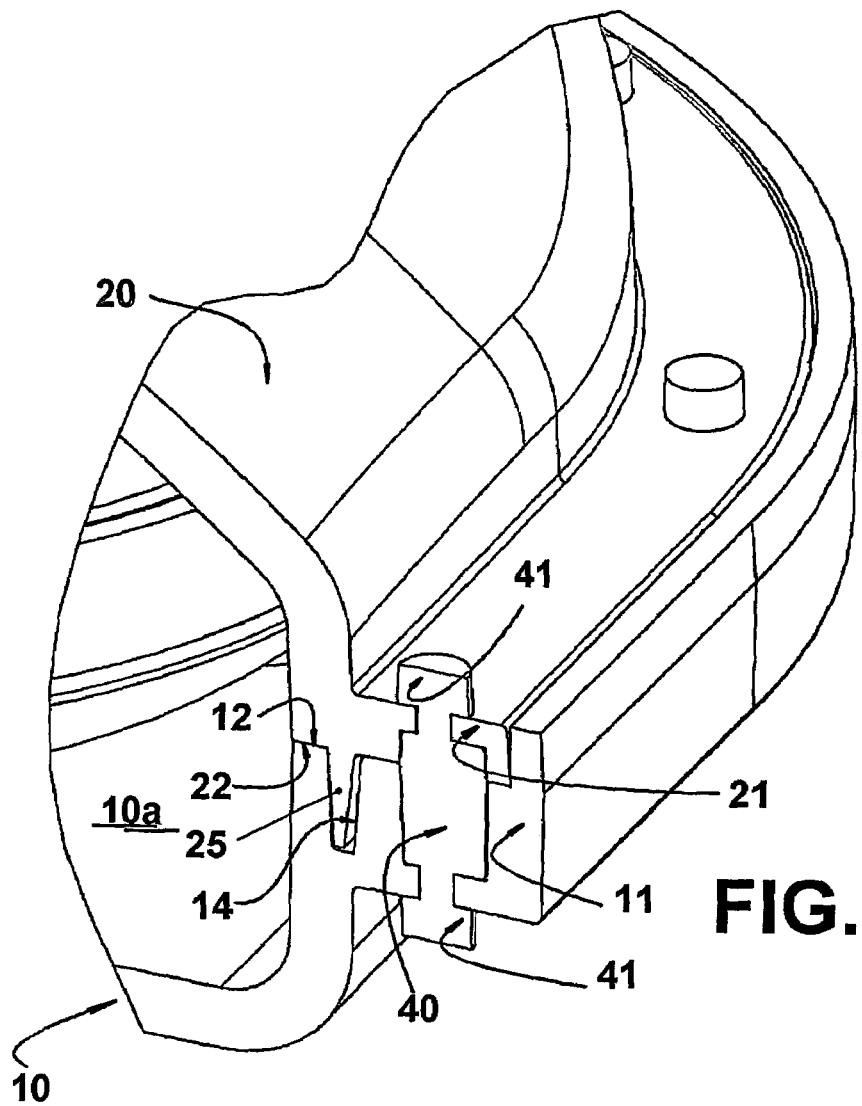
FIG. 1 is a schematic partial sectional perspective view of the joining region of the hollow base and the cover of a suction muffler constructed according to the present invention.
Figure 1A:
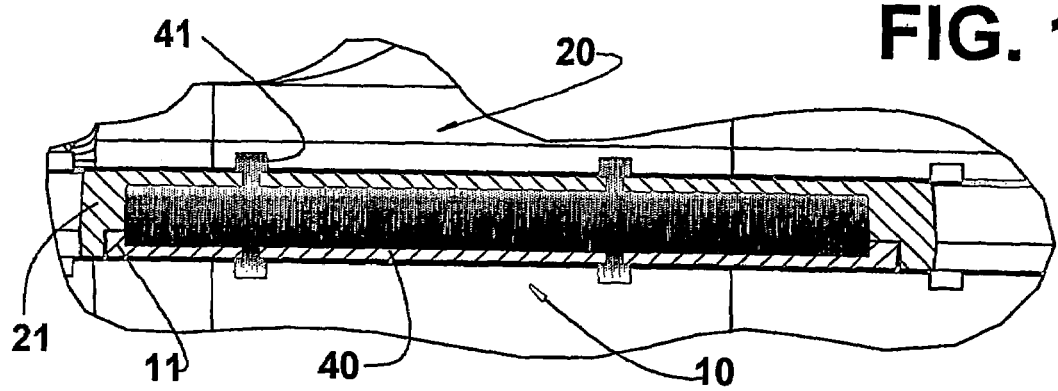
FIG. 1a is a schematic longitudinal sectional view of the mutually seated peripheral flanges of the parts defined by the hollow base and the cover, the channel internal to said peripheral flanges being filled with a gasket of injected material.

The present invention will be described in relation to a suction muffler of the type used in a hermetic compressor of a refrigeration system and which, though not illustrated, comprises, inside a hermetic shell, a motor-compressor assembly having a cylinder block within which is defined a cylinder, lodging at one end, a piston, and having an opposite end closed by a cylinder cover which defines, in its interior, a housing to receive the suction muffler, and a discharge chamber in selective fluid communication with a compression chamber defined inside the cylinder, between a top portion of the piston and a valve plate provided between the opposite end of the cylinder and the cylinder cover through suction and discharge orifices provided in said valve plate and which are selectively and respectively closed by suction and discharge valves.

According to the illustrations, the gas being drawn by the compressor and coming from a suction line of the refrigeration system opened to the interior of the hermetic shell reaches the latter through an inlet tube, affixed externally to said hermetic shell and in fluid communication with a suction muffler inside said hermetic shell and which is maintained in fluid communication with the interior of the suction chamber.

As illustrated in the enclosed drawings, the suction muffler of the present invention comprises a hollow base 10, usually obtained in a material of low thermal conductibility and presenting for example a rectangular cross section, and which is closed by a cover 20, to be seated on the upper edge of the hollow base 10 and which is secured thereon by a fixation means to be described ahead.

The hollow base 10 is provided with a gas inlet (not illustrated) in fluid communication with the gas supply of the compressor, and with a gas outlet (not illustrated) in fluid communication with a suction side of the compressor.

The cover 20 generally incorporates a gas outlet nozzle (not illustrated), with a free end configured to be adapted to the suction orifice of the valve plate of the cylinder cover of the hermetic compressor.

The hollow base 10 defines, therewithin, at least one acoustic chamber 10a in communication with the gas inlet and the gas outlet in relation to the interior of said hollow base 10.

Each of the parts of hollow base 10 and cover 20 includes a respective peripheral flange 11, 21, radially projecting from the respective part and which is constructed so as to allow said peripheral flanges 11, 21 to be mutually seated upon the closure of the suction muffler.

In the illustrated constructions, each of the parts of hollow base 10 and cover 20 has its respective peripheral flange 11, 21 projecting from a free edge portion 12, 22 of said part, which flanges are mutually seated to form the body of the suction muffler. Though not illustrated, the peripheral flanges 11, 21 may project from the respective part, spaced from the mutual seating free edge of the hollow base 10 and the cover 20, provided they maintain the mutual seating in the condition to form the body of the suction muffler in order to receive, in such condition, a retaining means to secure the hollow base 10 to the cover 20.

According to the present invention, the peripheral flanges 11, 21 are shaped to define, jointly, an internal channel 30 extended along at least part of the circumferential extension of said peripheral flanges 11, 21 and which is opened to the opposite external faces of the latter by means of throughbores 13, 23 axially aligned to each other in pairs, each pair of throughbores 13, 23 maintaining a circumferential distance in relation to an adjacent pair of throughbores 13, 23, the throughbores 13, 23 of each pair and the internal channel 30 being filled with a gasket 40 of injected material, for example plastic material, which projects beyond each pair of throughbores 13, 23, so as to define an axial lock portion 41 to be seated on each of the adjacent opposite external faces of said peripheral flanges 11, 21.

Figure 2:
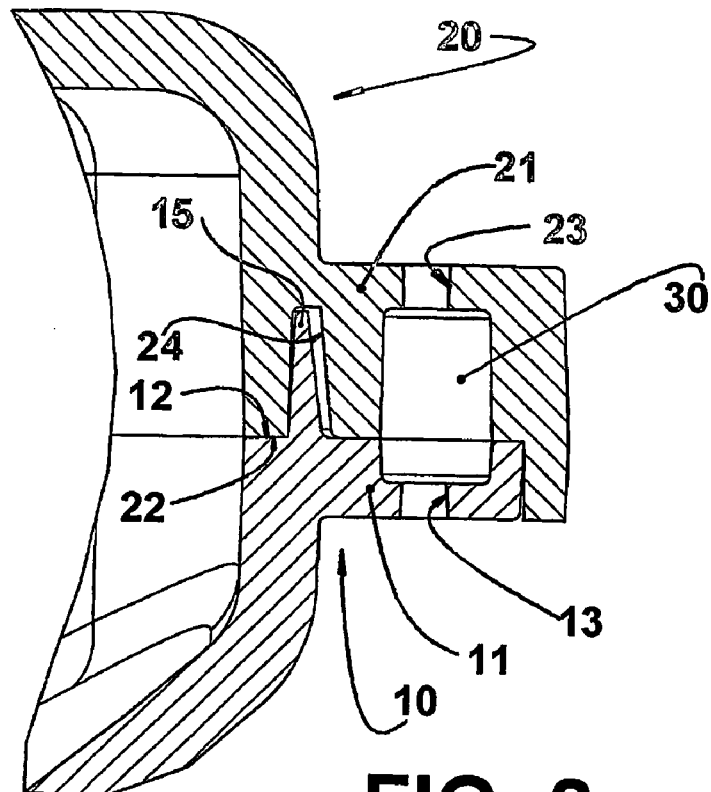
FIG. 2 is a schematic longitudinal sectional view of the joining region of the hollow base and the cover of the suction muffler illustrated in FIG. 1, before injecting the fixation material in the internal channel formed between said parts.
Figure 3:
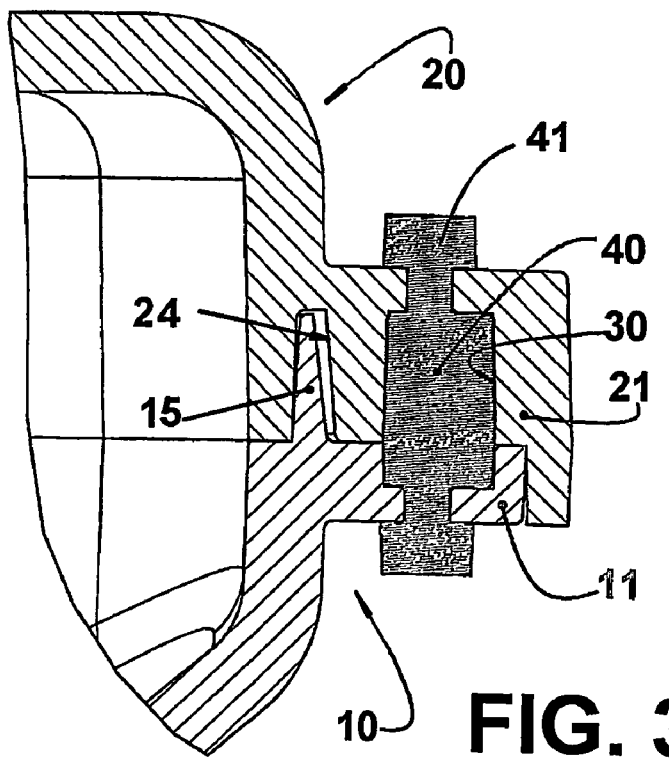
FIG. 3 is a view similar to that of FIG. 2, after injecting the fixation material in the internal channel formed between the hollow base and the cover of the suction muffler.

In the construction illustrated in FIGS. 1-3, the lock portion 41 has the form of a widened head, for example coaxial and aligned with an adjacent throughbore 13, 23 and which is seated on the external face of the adjacent peripheral flange 11, 21.

Figure 4:
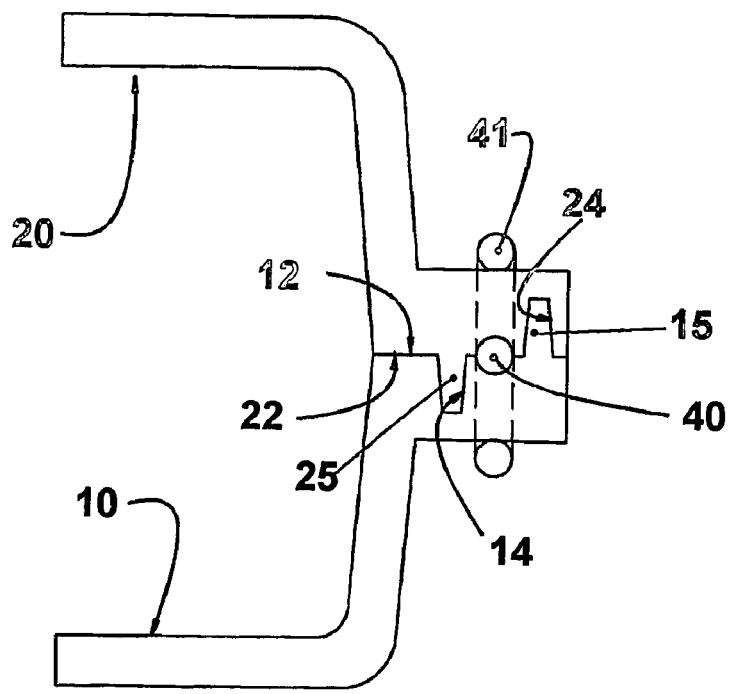
FIG. 4 is a schematic partial sectional view of the joining region of the hollow base and the cover of a suction muffler constructed according to another embodiment of the present invention.
Figure 5:
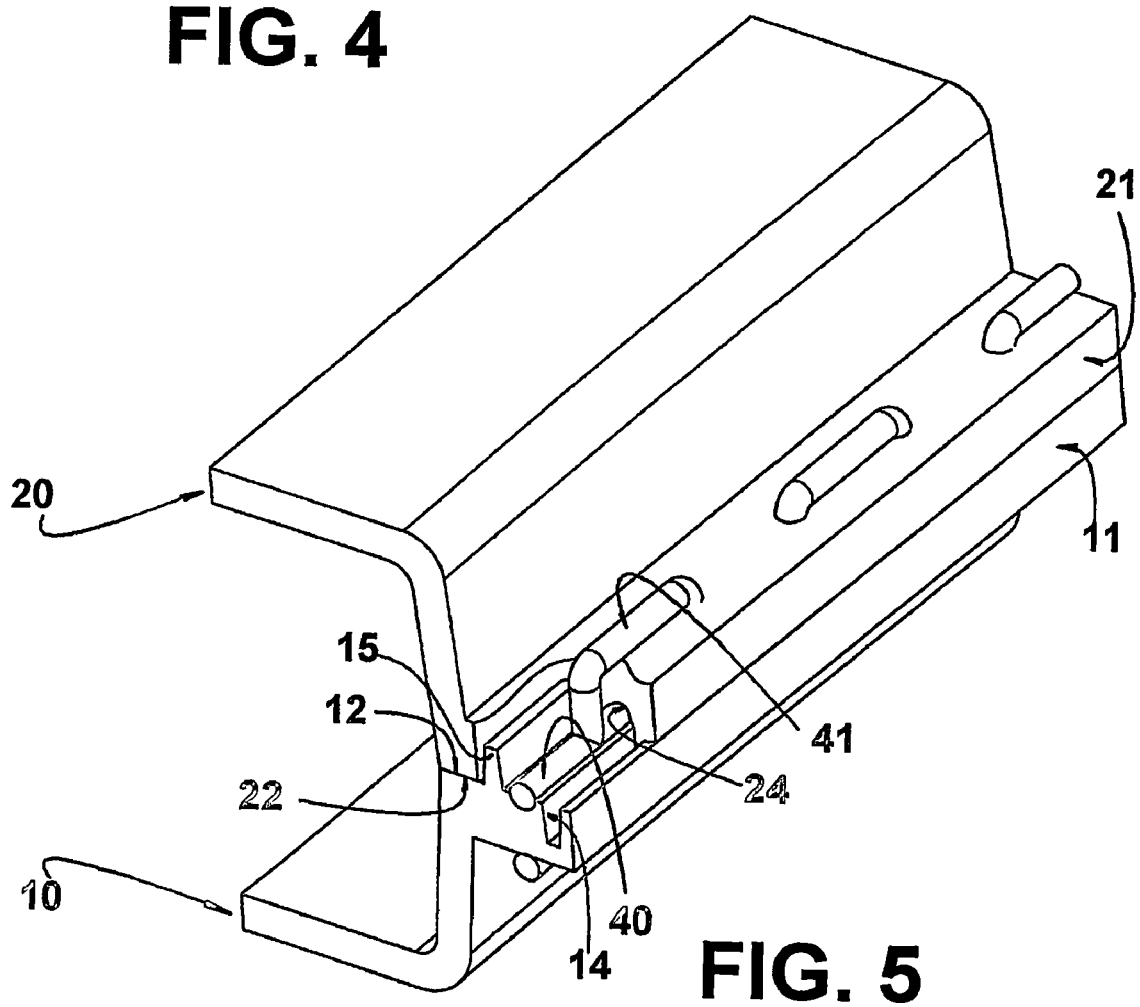
FIG. 5 is a schematic perspective view of the joining region illustrated in FIG. 4.
Figure 6:
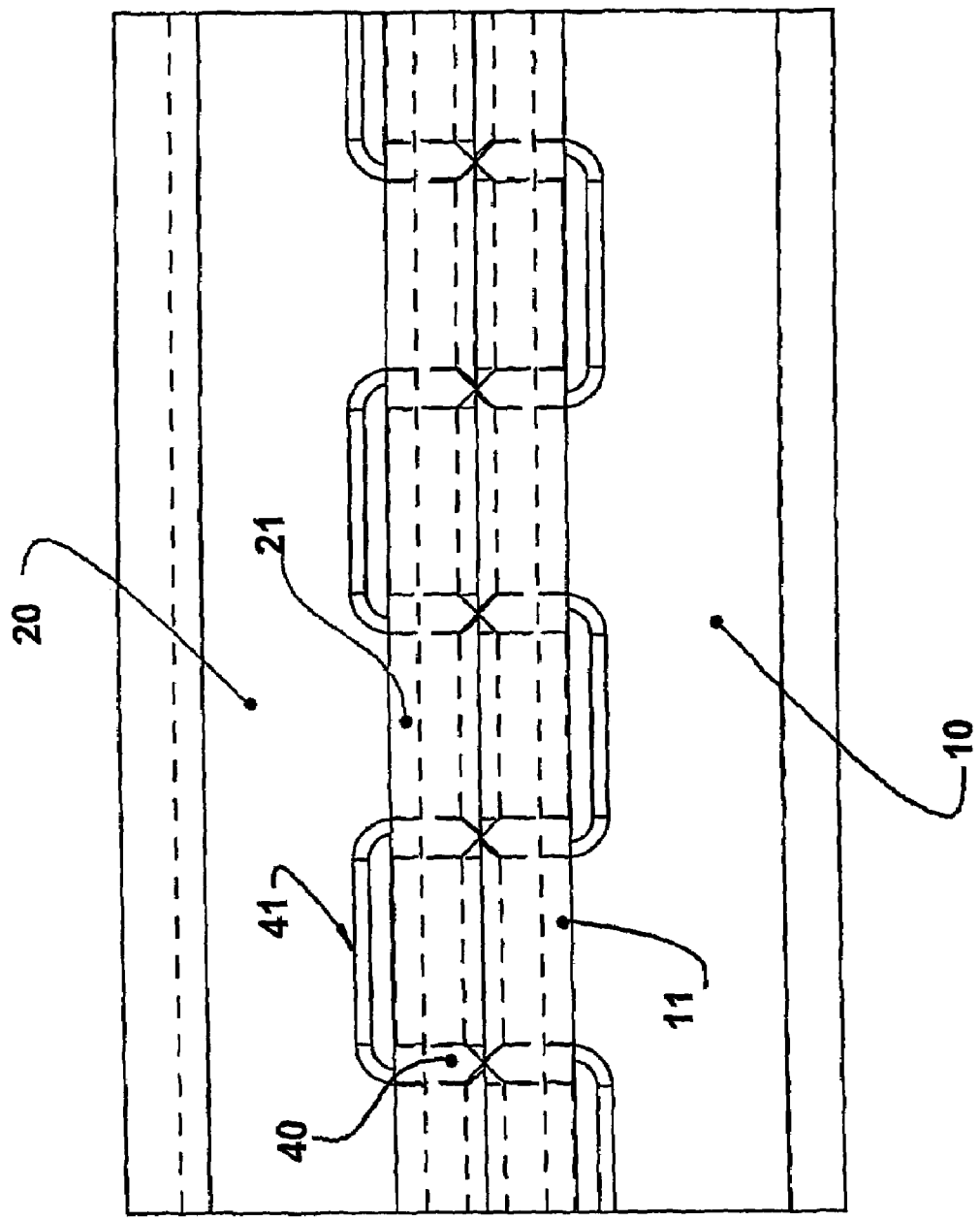
FIG. 6 is a lateral view of the joining region of the hollow base and the cover of the suction muffler illustrated in FIG. 4.

In the embodiment illustrated in FIGS. 4-6, the lock portion 41 is defined by a projection of the gasket 40, seated on the external face of an adjacent peripheral flange 11, 21 between two adjacent throughbores 13, 23 of two pairs of consecutive throughbores 13, 23. In this embodiment, the internal channel 30 is for example defined by channel portions which are spaced apart by a distance corresponding to the distance between two pairs of consecutive throughbores 13, 23 connected to each other by a lock portion 41.

In the construction illustrated in FIGS. 1-3, the internal channel is continuous along the circumferential extension of the peripheral flanges 11, 21, and for example presents a width, in relation to the transversal section of the throughbores 13, 23, which is larger than the width of the latter.

Although only two constructive forms for the internal channel 30 have been illustrated, it should be understood that the shape and the geometry thereof can vary without limiting the present solution.

In order to prevent the leakage of injected material from the gasket 40, and to guarantee an improved sealing to the gas in the interior of the suction muffler, the hollow base 10 and the cover 20 define, in the mutual seating condition of their peripheral flanges 11, 21, a labyrinth portion, which is for example obtained through the provision of grooves and recesses which are mutually fitted by interference with at least one of the parts defined by the free edge 12, 22 and the peripheral flange 11, 21, of each of the parts defined by the hollow base 10 and the cover 20.

In the construction illustrated in FIGS. 1-3, the peripheral flange 11 of the hollow base 10 defines a groove 14 which is projected to receive, by interference, a rib 25 defined in the peripheral flange 21 of the cover 20.

In the construction illustrated in FIGS. 4-6, each peripheral flange 11, 21 presents a respective groove 14, 24 and a respective rib 15, 25, with for example the mutually seatable pairs of grooves 14, 24 and of ribs 15, 25 being positioned radially spaced apart and separated by the channel portions that form the internal channel 30.

The system for closing the suction muffler described herein presents advantages in relation to the constructions of the known prior art suction mufflers, since it presents a hermetic union of the parts defined by the hollow base and the cover which form the body of the suction muffler, independently of the complexity of said parts, resulting in a suction muffler of high reliability and which is resistant to impacts, to thermal variations, and to fatigue. The present system provides the union of the hollow base 10 and the cover 20 with a sealing that avoids the occurrence of external leakages.

The present construction further conducts to a low manufacture cost and high repetitiveness, besides promoting the union of the components with wider ranges of tolerances and the use of elements that are fitted by interference to secure the internal components.

It should be understood that the illustrated embodiments described above are not intended to restrict the constructive concept defined in the appended claims and should be considered as exemplary constructions thereof.

The invention claimed is:

1. A system for closing a suction muffler of a hermetic compressor, said suction muffler comprising:
   a hollow base;
   a cover to be coupled to the hollow base, said parts defined by the hollow base and the cover including mutually seatable peripheral flanges; and
   a retaining means affixing the hollow base to the cover in the joining region where said peripheral flanges are mutually seated,
   wherein said peripheral flanges are shaped to define, jointly, an internal channel extended along at least part of the circumferential extension of said peripheral flanges and which is opened to the opposite external faces of the latter by means of throughbores axially aligned to each other in pairs,
   wherein each pair of throughbores maintaining a circumferential distance in relation to an adjacent pair of throughbores,
   wherein the throughbores of each pair and the internal channel being filled with a gasket of injected material, which projects outwardly from the throughbores so as to define an axial lock portion to be seated on each of the adjacent opposite external faces of said peripheral flanges.

2. The system as set forth in claim 1, wherein the internal channel is continuous along the circumferential extension of the peripheral flanges.

3. The system as set forth in claim 1, wherein each axial lock portion is defined by a projection of the gasket seated on the external face of the adjacent peripheral flange between two adjacent throughbores of two consecutive pairs of throughbores.

4. The system as set forth in claim 1, wherein each axial lock portion is in the form of a widened head seated on the external face of the adjacent peripheral flange.

5. The system as set forth in claim 1, wherein the material of the injected gasket is plastic.

6. The system as set forth in claim 1, wherein the hollow base and the cover define, in the mutual seating condition of their peripheral flanges, a labyrinth portion, for sealing the interior of the suction muffler and comprising at least one groove provided in one of said parts defined by the hollow base and the cover and in which is fitted, by interference, a respective rib provided in the other part.

7. The system as set forth in claim 6, wherein each peripheral flange defines at least one of the parts defined by the groove and the rib.

* * * * *